United States Patent
Liu et al.

(10) Patent No.: US 10,107,683 B2
(45) Date of Patent: Oct. 23, 2018

(54) ABSOLUTE-TYPE LINEAR ENCODER ABSOLUTE SIGNAL CONSISTENCY CORRECTION METHOD

(71) Applicant: CHANGCHUN INSTITUTE OF OPTICS, FINE MECHANICS AND PHYSICS, CHINESE ACADEMY OF SCIENCE, Jilin (CN)

(72) Inventors: Yang Liu, Jilin (CN); Dong Qiao, Jilin (CN); Fan Yang, Jilin (CN); Hongsheng Wu, Jilin (CN); Qifeng Zeng, Jilin (CN); Qiang Sun, Jilin (CN); Jia You, Jilin (CN)

(73) Assignee: CHANGCHUN INSTITUTE OF OPTICS, FINE MECHANICS AND PHYSICS, CHINESE ACADEMY OF SCIENCES, Changchun Jilin (CN)

( * ) Notice: Subject to any disclaimer, the term of this patent is extended or adjusted under 35 U.S.C. 154(b) by 0 days.

(21) Appl. No.: 15/520,827

(22) PCT Filed: Aug. 3, 2015

(86) PCT No.: PCT/CN2015/000552
§ 371 (c)(1),
(2) Date: Apr. 20, 2017

(87) PCT Pub. No.: WO2016/065729
PCT Pub. Date: May 6, 2016

(65) Prior Publication Data
US 2017/0328773 A1    Nov. 16, 2017

(30) Foreign Application Priority Data
Oct. 31, 2014 (CN) .......................... 2014 1 0617422

(51) Int. Cl.
*G01J 3/18* (2006.01)
*G01J 3/28* (2006.01)

(52) U.S. Cl.
CPC ............... *G01J 3/18* (2013.01); *G01J 3/2803* (2013.01); *G01J 2003/282* (2013.01)

(58) Field of Classification Search
CPC ....... G01J 3/18; G01J 3/2803; G01J 2003/282
See application file for complete search history.

(56) References Cited

U.S. PATENT DOCUMENTS 5,162,913 A    11/1992  Chatenever et al.
5,294,793 A     3/1994  Schwaiger et al.

FOREIGN PATENT DOCUMENTS

CA    2256231 A1    6/2000
CN    102101394 A   6/2011
(Continued)

OTHER PUBLICATIONS

PCT International Search Report and Written Opinion, PCT/CN2015/000552, dated Oct. 22, 2015, 8 Pages.

*Primary Examiner* — Tony Ko
(74) *Attorney, Agent, or Firm* — Fenwick & West LLP

(57) ABSTRACT

An absolute-type linear encoder absolute signal consistency correction method, related to the field of absolute-type linear encoder measurements, for solving the problem of narrow linear range for photoelectric responses and large signal dispersion found in an existing consistency correction method for a photoelectric conversion component and a processing circuit thereof. The correction method allows for enhanced absolute signal quality and increased system measurement precision.

1 Claim, 5 Drawing Sheets

(56) References Cited

FOREIGN PATENT DOCUMENTS

| | | | |
|---|---|---|---|
| CN | 102300057 | A | 12/2011 |
| CN | 103335671 | A | 10/2013 |
| CN | 104113674 | A | 10/2014 |
| CN | 104296661 | A | 1/2015 |
| JP | 2005147903 | A | 6/2005 |

(a)

(b)

ABSOLUTE-TYPE LINEAR ENCODER ABSOLUTE SIGNAL CONSISTENCY CORRECTION METHOD

CROSS REFERENCE TO RELATED APPLICATIONS

This application is a 35 U.S.C. 371 national stage filing of International Application No. PCT/CN2015/000552, filed on Aug. 3, 2015, which claims the benefit of Chinese Patent Application No. 201410617422.3 filed on Oct. 31, 2014, the disclosures of which are incorporated herein by reference.

TECHNICAL FIELD

Embodiments of the present disclosure relate to an absolute signal consistency correction method for an absolute grating scale, which belongs to a field of measurement of the absolute grating scale.

BACKGROUND

An absolute grating scale is mainly used as a full-closed loop in a high-end numerical control system, and has advantages that absolute positions can be obtained as long as the system is powered on, a zero position does not need to be searched, and moreover, optical detection is adopted, and the absolute grating scale is not wearable due to adoption of a non-contact structure. The absolute grating scale is a necessary key part in the numerical control industry in the future.

According to the absolute grating scale, absolute position codes are engraved on a glass scale board, and are projected onto a photodiode array by irradiation of parallel light, the photodiode array converts optical signals with absolute position information into electric signals, and the absolute positions can be known through analysis. However, due to some adverse factors such as nonuniform illumination intensity, low absolute code engraving quality, nonuniform photoelectric response of the photodiode array and the like, the finally output electric signals with the absolute positions are inconsistent, accurate judgment on the absolute positions is influenced, and accuracy of the absolute grating scale is reduced.

Therefore, in the production and manufacturing process of the absolute grating scale, a consistency correction method is required to make up the detects such that the absolute signals finally output by the absolute grating scale can accurately and precisely reflect the real absolute positions.

A method for consistency correction method of a photoelectric converter and its processing circuit is disclosed, as in the Chinese Patent Publication No. CN102300057A, which has a title of "Method for correcting response inconsistency of linear array CCD (Charge Coupled Device) image elements". The patent discloses that response inconsistency of CCD image elements is corrected by a formula of $S_i = k_i(y_i - (b_i * DC + c_i * g))$, and then digital gain adjustment is carried out on the correction result by a formula of $p_i = k * s_i$, where $p_i$ represents a result after the digital gain adjustment, and k represents a gain factor. This method only corrects response inconsistency of CCD image elements in a manner of changing the gain factor and thus has problems that the liner range of the photoelectric response is narrow and signal dispersion is large.

SUMMARY

In order to solve the problems that the liner range of the photoelectric response is narrow and signal dispersion is large, of the existing consistency correction method of a photoelectric converter and its processing circuit, the present disclosure provides an absolute signal consistency correction method for the absolute grating scale so as to reinforce quality of the absolute signals and improve measurement accuracy of a system.

The technical solution of the present disclosure to solve the technical problem is:

As shown in FIG. 1, an absolute signal voltage value consistency correction method for the absolute grating scale adopts a formula below:

$$v = P \cdot (1+A) \cdot I + Q \cdot (1+A) \cdot (C-D) + D \quad (1)$$

where, v represents a voltage value output by a photodiode array and an amplifying and sampling holding circuit array after processing of a consistency correction structure; I represents a bias current of a light source; P and Q represent two constant coefficient vectors of the photodiode array and the amplifying and sampling holding circuit array; D represents a constant voltage value; A represents a correction vector of a gain correction circuit of the photodiode array and the amplifying and sampling holding circuit array; and C represents a correction vector of a bias correction circuit of the photodiode array and the amplifying and sampling holding circuit array;

The formula (1) is simplified as $$v = K \cdot I + B \quad (2)$$

wherein, $$K = P \cdot (1+A) \quad (3)$$

$$B = Q \cdot (1+A) \cdot (C-D) + D \quad (4)$$

Characterized in that, the method comprises steps of

S1: by a host computer, respectively inputting two groups of initial correction data vectors $a_1[1:n]$ and $b_1[1:n]$ to the gain correction circuit and the bias correction circuit through a storage, then respectively regulating bias currents of the light source into $I_1, I_2, I_3, \ldots, I_m$ from weak to strong, where m represents a grade number of regulation, and simultaneously recording voltage values $v1_1[1:m], v1_2[1:m], v1_3[1:m], \ldots, v1_n[1:m]$ output by the n photodiodes under m grades of bias currents of the light source after processing of the consistency correction structure.

S2: carrying out linear fitting on response curves of the voltage values output by the n photodiodes under m grades of bias currents of the light source after processing of the consistency correction structure obtained in the step S1, as shown in FIG. 3, and then calculating slope vectors $K[1:n]$ and intercept vectors $B[1:n]$ of response straight lines of voltage values output by the n photodiodes under m grades of bias currents of the light source after processing of the consistency correction structure, so that the 2n constant coefficient vectors $P[1:n]$ and $Q[1:n]$ of the photodiode array and the amplifying and sampling holding circuit array can be obtained;

S3: selecting one of the n response straight lines obtained in the step S2 as a target straight line, fitting the other n−1 response straight lines to the target response straight line, as shown in FIG. 4(a), to obtain correction data vectors $a_2[1:n]$ of the gain correction circuit and correction data vectors $b_2[1:n]$ of the bias correction circuit;

S4: by the host computer, inputting the correction data vectors $a_2[1:n]$ and the correction data vectors $b_2[1:n]$, which are obtained in the step S3, into the gain correction circuit and the bias correction circuit through the storage, then regulating the bias current of the light source into an intermediate value $I_{m/2}$, and simultaneously recording voltage values $v2_1[m/2]$, $v2_2[m/2]$, $v2_3[m/2]$, ..., $v2_n[m/2]$ output by the n photodiodes under the bias current of the light source;

S5: carrying out averaging on n voltage values $v2_1[m/2]$, $v2_2[m/2]$, $v2_3[m/2]$, ..., $v2_n[m/2]$ obtained in the step S4, then translating all the response straight lines of the output voltages towards an average value, as shown in FIG. 4(b), and only regulating the correction data vectors of the bias correction circuit to obtain a group of new correction data vectors $b_3[1: n]$;

S6: repeating the step S4 and the step S5 until dispersions of the response straight lines of the out voltages meet requirements, and then obtaining correction data vectors $a_2[1: n]$ of the gain correction circuit and correction data vectors $b_4[1: n]$ of the bias correction circuit;

S7: carrying out linearity range expansion on the response straight lines of the output voltages, which are obtained in the step S6, as shown in FIG. 5, slightly increasing each value in the correction data vectors $a_2[1: n]$ of the gain correction circuit, and slightly reducing each value of the correction data vectors $b_4[1: n]$ of the bias correction circuit, so as to obtain new correction data vectors $a_3[1: n]$ of the gain correction circuit and new correction data vectors $b_5[1: n]$ of the bias correction circuit;

S8: by the host computer, transmitting the correction data vectors $a_3[1: n]$ of the gain correction circuit and the correction data vectors $b_5[1: n]$ of the bias correction circuit to the gain correction circuit and the bias correction circuit through the storage, detecting whether linearity ranges of the response straight lines of the output voltages meet requirements, and if no, repeating the step S7 until the requirements are met, so as to obtain correction data vectors $a_4[1: n]$ of the gain correction circuit and correction data vectors $b_6[1: n]$ of the bias correction circuit;

S9: detecting whether the dispersions of the response straight lines of the output voltages at the moment meet requirements, and if no, respectively inputting, by the host computer, two groups of new initial correction data $a_4[1: n]$ and $b_6[1: n]$ to the correction data vectors of the gain correction circuit and the correction data vectors of the bias correction circuit through the storage, and repeatedly executing the steps S1 to S9 until the dispersions and the linearity ranges of the response straight lines of the output voltages meet the requirements.

Advantageous effects of the present disclosure are that: the present disclosure solves the problem of inconsistency of finally output electrical signals with absolute positions, which is caused by factors such as nonuniform illumination intensity, low absolute code engraving quality, inconsistency of the photoelectric response of the photodiode array and the amplifying and sampling holding circuit, which reduces requirements of the absolute grating scale on selecting a lighting source, and in the meantime lowers difficulty in designing the amplifying and sampling holding circuit of the absolute grating scale, decreases the dispersions of the finally output electrical signals with absolute positions, increases the linear ranges of the absolute signals, reinforces quality of the absolute signals, improve measurement accuracy of a system, and achieves integration of the photodiode array, the amplifying and sampling holding circuit, the bias correction circuit, the gain correction circuit and the storage on one piece of silicon slice, and increases the speed and efficiency of reading the correction data;

The present disclosure realizes automatically performing a process step that the host computer carries out program control to dynamically regulate the consistency of the absolute signals of the absolute grating scale, which provides a basic condition for quickly and efficiently demarcating other key parameters of the absolute grating scale, and greatly improves the production efficiency.

BRIEF DESCRIPTION OF THE DRAWINGS

FIG. 4(a) is a schematic diagram before translating, and FIG. 4(b) is a schematic diagram after translating.

DETAILED DESCRIPTION

A method provided by the present disclosure will be further illustrated in details in connection with the drawings and embodiments in the following.

Figure 1:
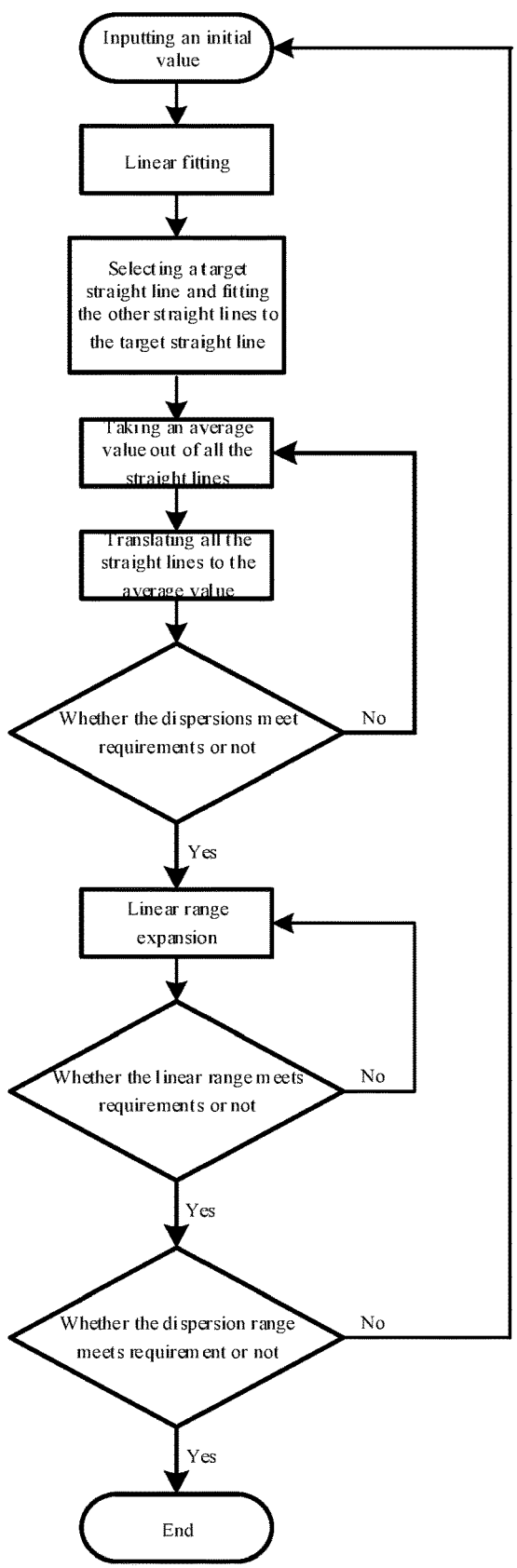
FIG. 1 is a flow chart of an absolute signal consistency correction method for an absolute grating scale according to the present disclosure.
Figure 2:
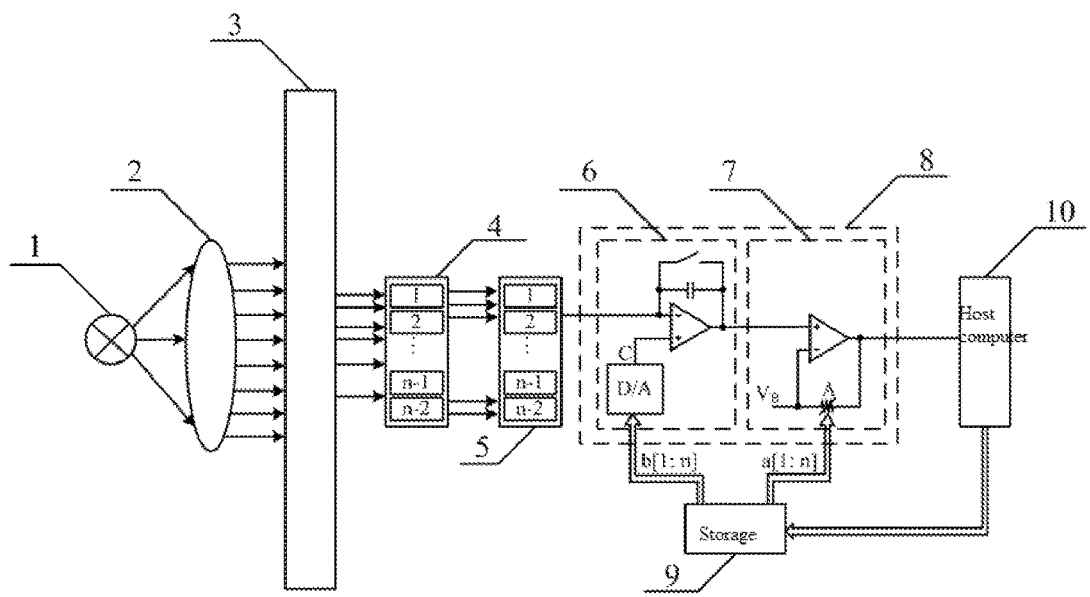
FIG. 2 is a structural schematic diagram of a system adopted by the absolute signal consistency correction method for the absolute grating scale according to the present disclosure.
Figure 3:
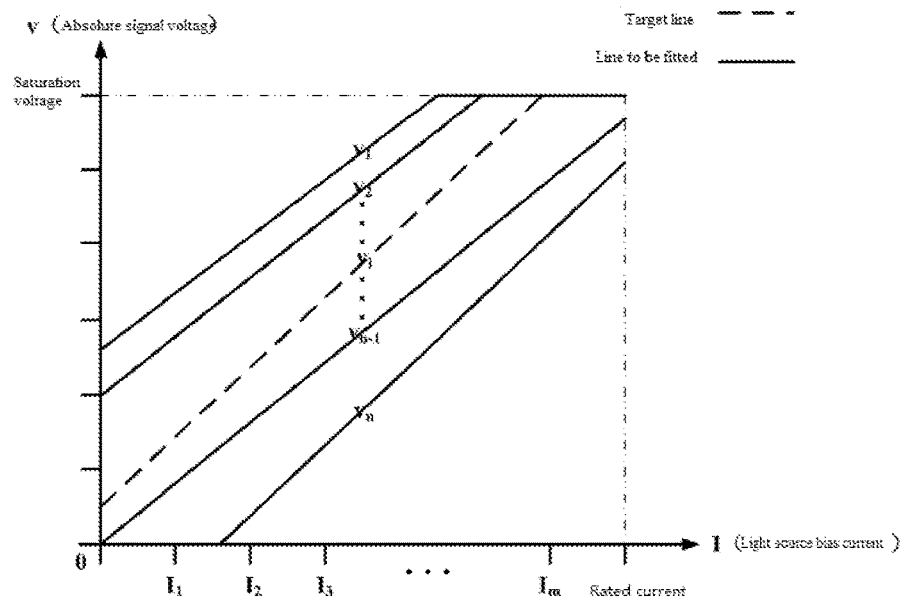
FIG. 3 is a schematic diagram of after linear fitting the n voltage response curves according to the present disclosure.
Figure 4:
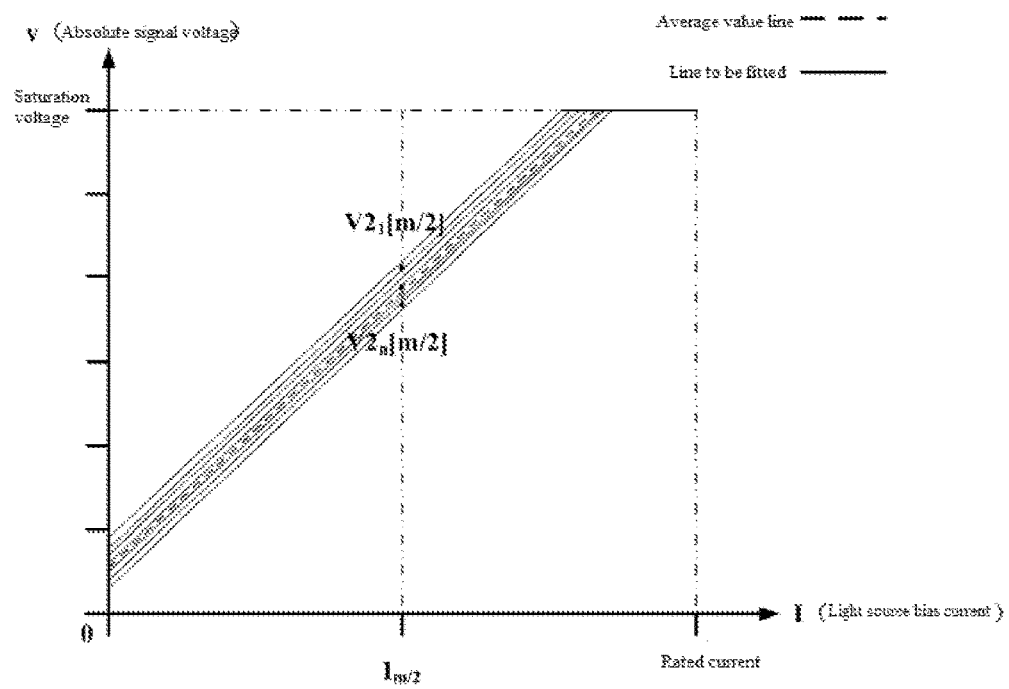
FIG. 4 is a schematic diagram of a process of translating the n response straight lines to an average value according to the present disclosure.
Figure 4:
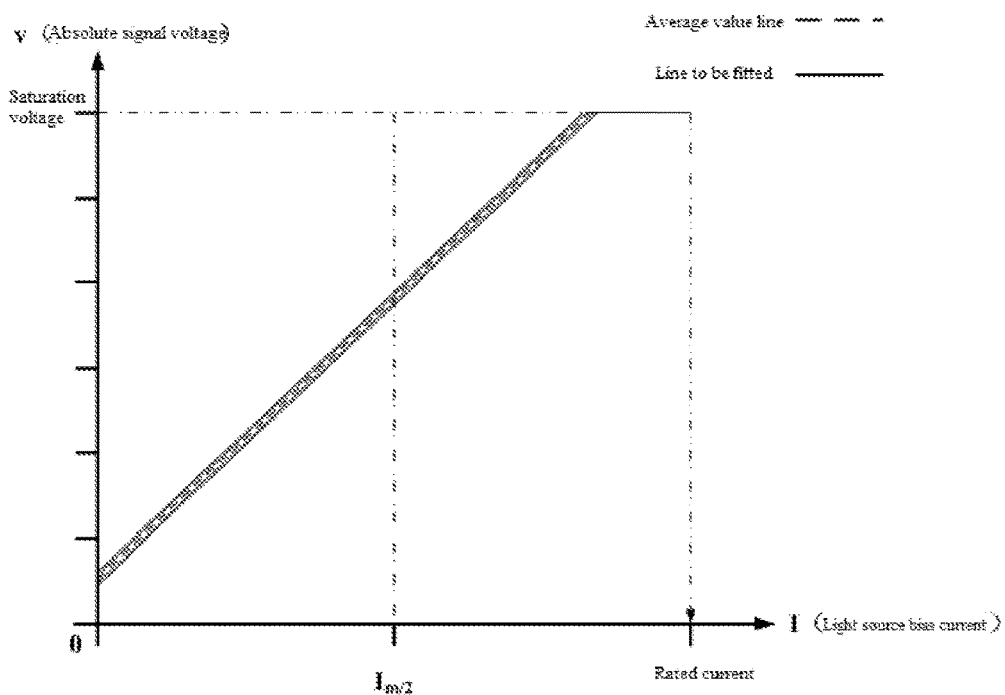
Figure 5:
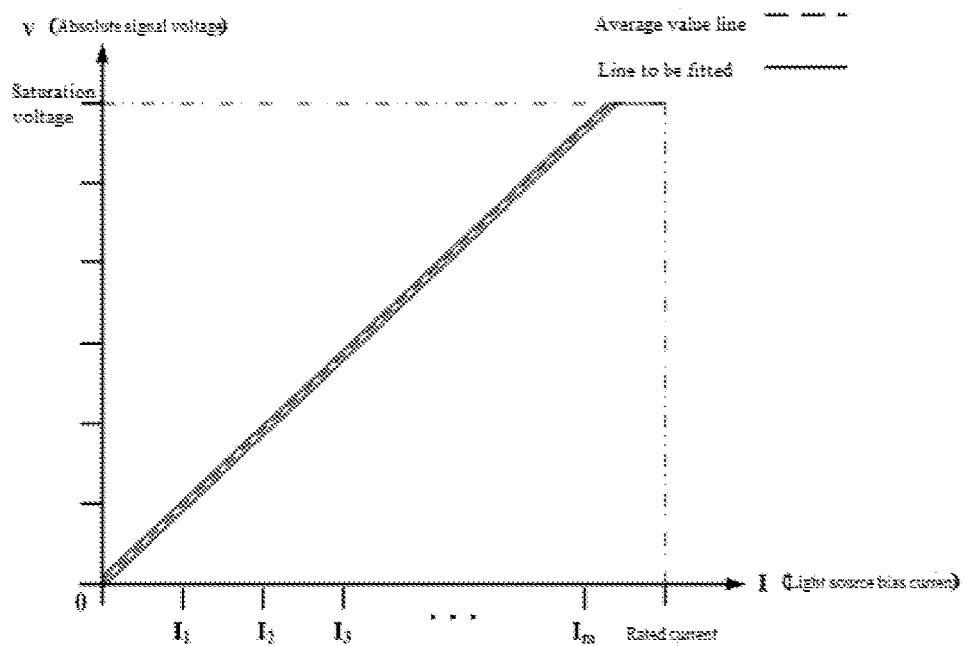
FIG. 5 is a schematic diagram of response straight lines of voltages output by the photodiode array and the amplifying and sampling holding circuit after processing of a consistency correction structure, which are subjected to linearity range expansion, according to the present disclosure.

As shown in FIG. 2, a system structure adopted by an absolute signal consistency correction method for an absolute grating scale includes a light source 1, a collimating lens 2, a grating scale 3 on which absolute codes are engraved, a photodiode array 4, an amplifying and sampling holding circuit array 5, a bias correction circuit 6, a gain correction circuit 7, a consistency correction structure 8, a storage 9 and a host computer 10, wherein, the consistency correction structure 8 includes the bias correction circuit 6 and the gain correction circuit 7. The photodiode array 4, the amplifying and sampling holding circuit array 5, the bias correction circuit 6, the gain correction circuit 7 and the storage 9 are integrated on one silicon slice.

The system structure adopts a working principle that firstly, a system is powered on, and the host computer 10 transmits initial correction data vectors $a_1[1: n]$ of the gain correction circuit 7 and initial correction data vectors $b_1[1: n]$ of the bias correction circuit 6 to the storage 9; the light source 1 can emit light with corresponding intensities by regulating bias currents of the light source 1, the light passes through the collimating lens 2 to generate parallel light, and after the parallel light passes through the grating scale 3 on which the absolute codes are engraved, the photodiode array 4 receives optical signals with the absolute codes and outputs n light currents with absolute code information, and then the amplifying and sampling holding circuit array 5 carries out amplifying and sampling holding processing on the n light currents and outputs n voltage signals with the absolute code information; the bias correction circuit 6 requests the correction data vectors $b_1[1:n]$ of the bias correction circuit 6 for the storage 9, correction vectors C of the bias correction circuit 6 are formed by a D/A (Digital-to-Analog) conversion circuit, simultaneously, the gain correction circuit 7 requests the correction data vectors $a_1[1:n]$ of the gain correction circuit 7 for the storage 9, and the correction data vectors $a_1[1:n]$ are converted into correction vectors A of the gain correction circuit 7. The bias correction circuit 6 and the gain correction circuit 7 correct the voltage signals with the absolute code information, which are output by the amplifying and sampling holding circuit array 5 and uploads corrected voltages to the host computer 10, and the host computer 10 judges whether linearity ranges and dispersions of response straight lines of voltages output by the photodiode array 4 and the amplifying and sampling holding circuit array 5 of the absolute grating scale under m grades of bias currents of the light source 1 after processing of the consistency correction structure 8 meet requirements.

Embodiments

The absolute signal consistency correction method for the absolute grating scale specifically includes steps of:

S1: by the host computer 10, respectively inputting two groups of initial correction data vectors $a_1[1:n]$ and $b_1[1:n]$ to the gain correction circuit 7 and the bias correction circuit 6 of the consistency correction structure 8 of the photodiode array 4 (20 photodiodes are selected) and the amplifying and sampling holding circuit array 5 (20 amplifying and sampling holding circuits are selected) of the absolute grating scale through the storage 9; supposing that each element value in the correction data vectors $a_1[1:n]$ of the gain correction circuit 7 is 15 and each element value in the correction data vectors $b_1[1:n]$ of the bias correction circuit 6 is 32.

Figure 6:
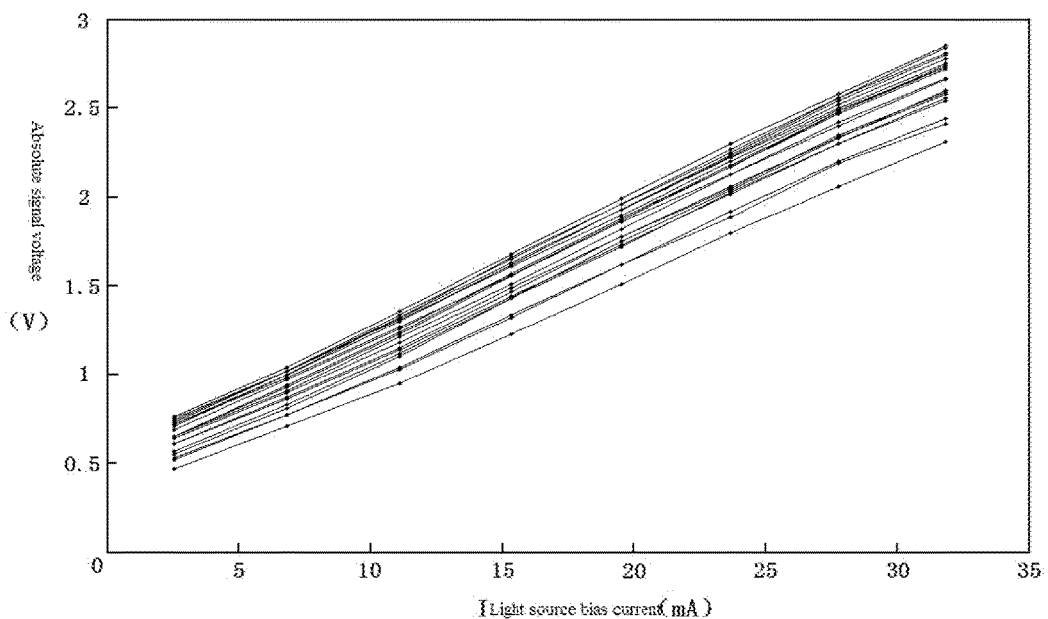
FIG. 6 shows response curves of voltages output by 20 photodiodes and 20 amplifying and sampling holding circuits after processing of the consistency correction structure in the initial data correction process in an embodiment of the present disclosure.

A rated bias current of the adopted light source 1 is 50 mA, 8 bias current grades of the light source 1 are taken respectively as 2.5 mA, 7.0 mA, 11.0 mA, 15.5 mA, 19.5 mA, 23.5 mA, 28.0 mA and 32.0 mA, bias currents of the light source 1 are regulated respectively to the above 8 values, voltage values $v1_1[1:8]$, $v1_2[1:8]$, $v1_3[1:8]$, ..., $v1_{20}[1:8]$ output by the 20 photodiodes and the 20 amplifying and sampling holding circuits under each bias current of the light source 1 after processing of the consistency correction structure 8 are stored on the host computer 10, and the diagram is drawn on the host computer 10; as shown in FIG. 6, a saturation output voltage of the design circuit is 3.3V, and response curves of output voltages after processing of the consistency correction structure 8 are great in dispersion and are also not wide in linearity range.

S2: carrying out linear fitting on the response curves of the voltages $v1_1[1:8]$, $v1_2[1:8]$, $v1_3[1:8]$, ..., $v1_{20}[1:8]$ output by the 20 photodiodes after processing of the consistency correction structure 8, which are obtained in the step S1, and then calculating slope vectors K[1:20] and intercept vectors B[1:20] of 20 response straight lines after fitting, as shown in Table 1:

TABLE 1

| Slope | K[1] | K[2] | K[3] | K[4] | K[5] | K[6] | K[7] | K[8] | K[9] | K[10] |
|---|---|---|---|---|---|---|---|---|---|---|
| | 0.067 | 0.070 | 0.068 | 0.064 | 0.071 | 0.069 | 0.072 | 0.069 | 0.073 | 0.067 |
| Slope | K[11] | K[12] | K[13] | K[14] | K[15] | K[16] | K[17] | K[18] | K[19] | K[20] |
| | 0.072 | 0.067 | 0.066 | 0.069 | 0.070 | 0.073 | 0.072 | 0.069 | 0.071 | 0.072 |
| Intercept | B[1] | B[2] | B[3] | B[4] | B[5] | B[6] | B[7] | B[8] | B[9] | B[10] |
| | 0.537 | 0.497 | 0.450 | 0.274 | 0.340 | 0.563 | 0.458 | 0.416 | 0.447 | 0.323 |
| Intercept | B[11] | B[12] | B[13] | B[14] | B[15] | B[16] | B[17] | B[18] | B[19] | B[20] |
| | 0.540 | 0.415 | 0.330 | 0.373 | 0.445 | 0.541 | 0.520 | 0.551 | 0.525 | 0.566 |

Suppose that according to design of the consistency correction structure 8, the D/A conversion circuit in the bias correction circuit 6 reads corresponding correction data vectors b[1:20] of the bias correction circuit 6 from the storage 9, and converts the correction data vectors b[1:20] into corresponding correction vectors C[1:20] of the bias correction circuit 6, and a conversion formula is:

$$C[i]=0.00343a[i]+0.191 \quad i=1,2,\ldots 20 \tag{5}$$

The gain correction circuit 7 reads corresponding correction data vectors a[1:20] of the gain correction circuit 7 from the storage 9, and converts the correction data vectors a[1:20] into corresponding correction vectors A[1:20] of the gain correction circuit 7, and a conversion formula is:

$$A[i]=0.16b[i]+0.156 \quad i=1,2,\ldots 20 \tag{6}$$

By the formulas (3), (4), (5) and (6), 40 constant coefficient vectors P[1:20] and Q[1:20] can be calculated, as shown in Table 2:

TABLE 2

| P[1] | P[2] | P[3] | P[4] | P[5] | P[6] | P[7] | P[8] | P[9] | P[10] |
|---|---|---|---|---|---|---|---|---|---|
| 0.0135 | 0.0142 | 0.0136 | 0.0129 | 0.0144 | 0.0140 | 0.0146 | 0.0139 | 0.0146 | 0.0135 |
| P[11] | P[12] | P[13] | P[14] | P[15] | P[16] | P[17] | P[18] | P[19] | P[20] |
| 0.0145 | 0.0136 | 0.0133 | 0.0139 | 0.0142 | 0.0146 | 0.0146 | 0.0139 | 0.0144 | 0.0146 |
| Q[1] | Q[2] | Q[3] | Q[4] | Q[5] | Q[6] | Q[7] | Q[8] | Q[9] | Q[10] |
| 1.7487 | 1.4874 | 1.1798 | 0.0245 | 0.4604 | 1.9195 | 1.2310 | 0.9584 | 1.1602 | 0.3482 |
| Q[11] | Q[12] | Q[13] | Q[14] | Q[15] | Q[16] | Q[17] | Q[18] | Q[19] | Q[20] |
| 1.7682 | 0.9531 | 0.3942 | 0.6744 | 1.1487 | 1.7778 | 1.6409 | 1.8422 | 1.6708 | 1.9376 |

S3: selecting a tenth response straight line from 20 response straight lines obtained in the step S2 as a target response straight line, fitting the other 19 response straight lines to the target response straight line, and calculating, by the host computer 10, correction data vectors $a_2[1:20]$ of the gain correction circuit 7 and correction data vectors $b_2[1:20]$ of the bias correction circuit 6 after fitting, as shown in Table 3:

TABLE 3

| $a_2[1]$ | $a_2[2]$ | $a_2[3]$ | $a_2[4]$ | $a_2[5]$ | $a_2[6]$ | $a_2[7]$ | $a_2[8]$ | $a_2[9]$ | $a_2[10]$ |
|---|---|---|---|---|---|---|---|---|---|
| 19 | 17 | 19 | 21 | 17 | 18 | 16 | 18 | 16 | 19 |
| $a_2[11]$ | $a_2[12]$ | $a_2[13]$ | $a_2[14]$ | $a_2[15]$ | $a_2[16]$ | $a_2[17]$ | $a_2[18]$ | $a_2[19]$ | $a_2[20]$ |
| 16 | 19 | 20 | 18 | 17 | 16 | 16 | 18 | 17 | 16 |
| $b_2[1]$ | $b_2[2]$ | $b_2[3]$ | $b_2[4]$ | $b_2[5]$ | $b_2[6]$ | $b_2[7]$ | $b_2[8]$ | $b_2[9]$ | $b_2[10]$ |
| 24 | 25 | 25 | 31 | 28 | 24 | 25 | 25 | 25 | 29 |
| $b_2[11]$ | $b_2[12]$ | $b_2[13]$ | $b_2[14]$ | $b_2[15]$ | $b_2[16]$ | $b_2[17]$ | $b_2[18]$ | $b_2[19]$ | $b_2[20]$ |
| 24 | 25 | 28 | 26 | 25 | 24 | 24 | 24 | 24 | 24 |

S4: by the host computer 10, inputting the correction data vectors $a_2[1:20]$ of the gain correction circuit 7 and the correction data vectors $b_2[1:20]$ of the bias correction circuit 6, which are obtained in the step S3, into the consistency correction structure 8 through the storage 9, then regulating the bias current of the light source 1 into an intermediate value $I_4$, and simultaneously recording voltage values $v2_1[4], v2_2[4], v2_3[4], \ldots, v2_{20}[4]$ output by the 20 photodiodes under the bias current of the light source 1, as shown in Table 4:

TABLE 4

| $v2_1[4]$ | $v2_2[4]$ | $v2_3[4]$ | $v2_4[4]$ | $v2_5[4]$ | $v2_6[4]$ | $v2_7[4]$ | $v2_8[4]$ | $v2_9[4]$ | $v2_{10}[4]$ |
|---|---|---|---|---|---|---|---|---|---|
| 1.40 | 1.40 | 1.35 | 1.33 | 1.35 | 1.45 | 1.35 | 1.31 | 1.36 | 1.33 |
| $v2_{11}[4]$ | $v2_{12}[4]$ | $v2_{13}[4]$ | $v2_{14}[4]$ | $v2_{15}[4]$ | $v2_{16}[4]$ | $v2_{17}[4]$ | $v2_{18}[4]$ | $v2_{19}[4]$ | $v2_{20}[4]$ |
| 1.40 | 1.30 | 1.31 | 1.31 | 1.34 | 1.42 | 1.38 | 1.42 | 1.38 | 1.42 |

S5: carrying out averaging on the voltage values $v2_1[4], v2_2[4], v2_3[4], \ldots, v2_{20}[4]$ in the step S4 to obtain an average value of 1.37, then only regulating the correction data vectors $b_2[1:20]$ of the bias correction circuit 6, translating the response straight lines of the output voltages after processing of the consistency correction structure 8 towards the position of the average value of 1.37, and according to the formulas (4) and (5), calculating, by the host computer 10, a group of new correction data vectors $b_3[1:20]$ of bias correction circuit 6, as shown in Table 5:

TABLE 5

| $b_3[1]$ | $b_3[2]$ | $b_3[3]$ | $b_3[4]$ | $b_3[5]$ | $b_3[6]$ | $b_3[7]$ | $b_3[8]$ | $b_3[9]$ | $b_3[10]$ |
|---|---|---|---|---|---|---|---|---|---|
| 24 | 25 | 26 | 33 | 29 | 22 | 26 | 27 | 26 | 31 |
| $b_3[11]$ | $b_3[12]$ | $b_3[13]$ | $b_3[14]$ | $b_3[15]$ | $b_3[16]$ | $b_3[17]$ | $b_3[18]$ | $b_3[19]$ | $b_3[20]$ |
| 24 | 27 | 30 | 28 | 26 | 23 | 24 | 23 | 23 | 22 |

Figure 7:
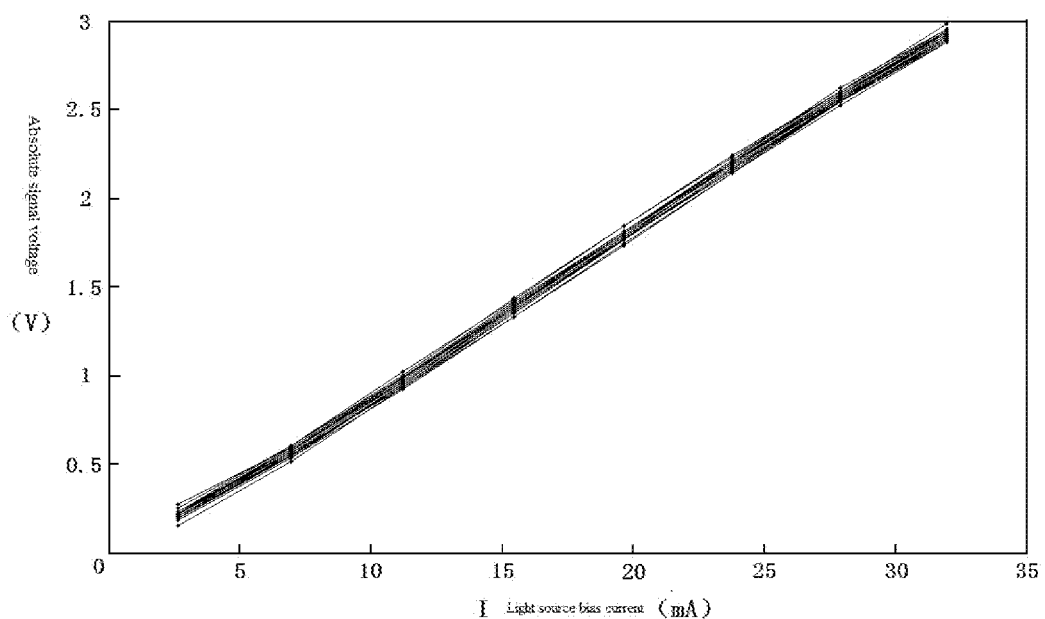
FIG. 7 shows translated response straight lines of the voltages output by 20 photodiodes and 20 amplifying and sampling holding circuits after processing of the consistency correction structure in the embodiment of the present disclosure.

S6: repeating the step S4 and the step S5 until the dispersions of the response straight lines of the output voltages meet requirements. The 20 translated response straight lines are as shown in FIG. 7. Then correction data vectors $b_4[1:n]$ of the bias correction circuit 6 are obtained, as shown in Table 6:

TABLE 6

| $b_4[1]$ | $b_4[2]$ | $b_4[3]$ | $b_4[4]$ | $b_4[5]$ | $b_4[6]$ | $b_4[7]$ | $b_4[8]$ | $b_4[9]$ | $b_4[10]$ |
|---|---|---|---|---|---|---|---|---|---|
| 24 | 25 | 26 | 32 | 29 | 22 | 26 | 27 | 26 | 31 |
| $b_4[11]$ | $b_4[12]$ | $b_4[13]$ | $b_4[14]$ | $b_4[15]$ | $b_4[16]$ | $b_4[17]$ | $b_4[18]$ | $b_4[19]$ | $b_4[20]$ |
| 24 | 27 | 30 | 28 | 27 | 23 | 24 | 23 | 23 | 23 |

S7: carrying out linearity range expansion on the response straight lines of the output voltages, which are obtained in the step S6, so as to meet an input range requirement of a subsequent analog-digital collector, slightly increasing each value in the correction data vectors $a_2[1:20]$ of the gain correction circuit 7, and slightly reducing each value of the correction data vectors $b_4[1:20]$ of the bias correction circuit 6, so as to obtain new correction data vectors $a_3[1:20]$ of the gain correction circuit 7 and new correction data vectors $b_5[1:20]$ of the bias correction circuit 6, as shown in Table 7:

TABLE 7

| $a_3[1]$ | $a_3[2]$ | $a_3[3]$ | $a_3[4]$ | $a_3[5]$ | $a_3[6]$ | $a_3[7]$ | $a_3[8]$ | $a_3[9]$ | $a_3[10]$ |
|---|---|---|---|---|---|---|---|---|---|
| 29 | 27 | 29 | 31 | 27 | 28 | 26 | 28 | 26 | 29 |
| $a_3[11]$ | $a_3[12]$ | $a_3[13]$ | $a_3[14]$ | $a_3[15]$ | $a_3[16]$ | $a_3[17]$ | $a_3[18]$ | $a_3[19]$ | $a_3[20]$ |
| 26 | 29 | 30 | 28 | 27 | 26 | 26 | 28 | 27 | 26 |
| $b_5[1]$ | $b_5[2]$ | $b_5[3]$ | $b_5[4]$ | $b_5[5]$ | $b_5[6]$ | $b_5[7]$ | $b_5[8]$ | $b_5[9]$ | $b_5[10]$ |
| 17 | 18 | 19 | 25 | 22 | 15 | 19 | 20 | 19 | 24 |
| $b_5[11]$ | $b_5[12]$ | $b_5[13]$ | $b_5[14]$ | $b_5[15]$ | $b_5[16]$ | $b_5[17]$ | $b_5[18]$ | $b_5[19]$ | $b_5[20]$ |
| 17 | 20 | 23 | 21 | 20 | 16 | 17 | 16 | 16 | 16 |

Figure 8:
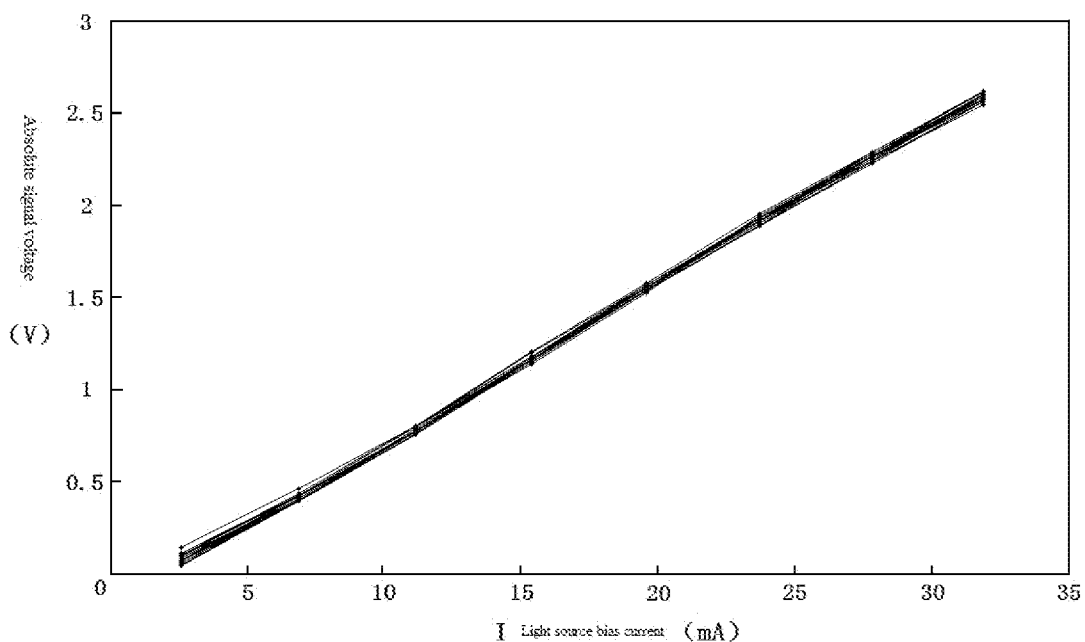
FIG. 8 shows response straight lines of the voltages output by 20 photodiodes and 20 amplifying and sampling holding circuits after processing of the consistency correction structure, which are subjected to linearity range expansion, in the embodiment of the present disclosure.

S8: by the host computer 10, transmitting the correction data vectors $a_3[1:20]$ of the gain correction circuit 7 and the correction data vectors $b_5[1:20]$ of the bias correction circuit 6 to the gain correction circuit 7 and the bias correction circuit 6 through the storage 9, detecting whether the linearity ranges of the response straight lines of the output voltages meet requirements at the moment; as shown in FIG. 8, the linearity ranges of the response straight lines of the output voltages are obviously improved compared to those in FIG. 6.

S9: detecting whether the dispersions of the response straight lines of the output voltages at the moment meet requirements, and if no, by the host computer 10, respectively inputting two groups of new initial correction data $a_3[1:20]$ and $b_5[1:20]$ to the correction data vectors of the gain correction circuit 7 and the correction data vectors of the bias correction circuit 6, and repeatedly executing the steps S1 to S9 until the dispersions and the linearity ranges of the response straight lines of the output voltages after processing of the consistency correction structure 8 meet the requirements. Finally, correction data vectors $a_4[1:20]$ of the gain correction circuit 7 and correction data vectors $b_6[1:20]$ of the bias correction circuit 6 are obtained, as shown in Table 8.

TABLE 8

| $a_4[1]$ | $a_4[2]$ | $a_4[3]$ | $a_4[4]$ | $a_4[5]$ | $a_4[6]$ | $a_4[7]$ | $a_4[8]$ | $a_4[9]$ | $a_4[10]$ |
|---|---|---|---|---|---|---|---|---|---|
| 33 | 31 | 33 | 36 | 30 | 31 | 30 | 32 | 29 | 34 |
| $a_4[11]$ | $a_4[12]$ | $a_4[13]$ | $a_4[14]$ | $a_4[15]$ | $a_4[16]$ | $a_4[17]$ | $a_4[18]$ | $a_4[19]$ | $a_4[20]$ |
| 30 | 32 | 29 | 34 | 30 | 33 | 34 | 32 | 31 | 30 |
| $b_6[1]$ | $b_6[2]$ | $b_6[3]$ | $b_6[4]$ | $b_6[5]$ | $b_6[6]$ | $b_6[7]$ | $b_6[8]$ | $b_6[9]$ | $b_6[10]$ |
| 14 | 15 | 17 | 23 | 20 | 14 | 16 | 18 | 17 | 21 |
| $b_6[11]$ | $b_6[12]$ | $b_6[13]$ | $b_6[14]$ | $b_6[15]$ | $b_6[16]$ | $b_6[17]$ | $b_6[18]$ | $b_6[19]$ | $b_6[20]$ |
| 13 | 18 | 22 | 19 | 17 | 13 | 14 | 14 | 14 | 13 |

The invention claimed is:

1. An absolute signal consistency correction method for an absolute grating scale, the method adopting a formula of:

$$v = P \cdot (1+A) \cdot I + Q \cdot (1+A) \cdot (C-D) + D$$

where v represents a voltage value output by a photodiode array and an amplifying and sampling holding circuit array after processing of a consistency correction structure; I represents a bias current of a light source; P and Q represent two constant coefficient vectors of the photodiode array and the amplifying and sampling holding circuit array; D represents a constant voltage value; A represents a correction vector of a gain correction circuit of the photodiode array and the amplifying and sampling holding circuit array; and C represents a correction vector of a bias correction circuit of the photodiode array and the amplifying and sampling holding circuit array; the above formula simplified as $$v = K \cdot I + B$$

wherein, $K = P \cdot (1+A)$, $B = Q \cdot (1+A) \cdot (C+D) + D$, the method comprising steps of:

S1: by a host computer, respectively inputting two groups of initial correction data vectors $a_1[1:n]$ and $b_1[1:n]$ to the gain correction circuit and the bias correction circuit through a storage; then respectively regulating bias currents of the light source into $I_1, I_2, I_3, \ldots, I_m$ from weak to strong, where m represents a grade number of regulation, and simultaneously recording voltage values $v1_1[1:m]$, $v1_2[1:m]$, $v1_3[1:m]$, ..., $v1_n[1:m]$ output by the n photodiodes under m grades of bias currents of the light source after processing of the consistency correction structure;

S2: carrying out linear fitting on response curves of the voltage values output by the n photodiodes under m grades of bias currents of the light source after processing of the consistency correction structure obtained in the step S1, and then calculating slope vectors $K[1:n]$ and intercept vectors $B[1:n]$ of response straight lines of voltage values output by the n photodiodes under m grades of bias currents of the light source after processing of the consistency correction structure, so that the 2n constant coefficient vectors $P[1:n]$ and $Q[1:n]$ of the photodiode array and the amplifying and sampling holding circuit array can be obtained;

S3: selecting one of the n response straight lines obtained in the step S2 as a target straight line, fitting the other n−1 response straight lines to the target response straight line, to obtain correction data vectors $a_2[1:n]$ of the gain correction circuit and correction data vectors $b_2[1:n]$ of the bias correction circuit;

S4: by the host computer, inputting the correction data vectors $a_2[1:n]$ and the correction data vectors $b_2[1:n]$, which are obtained in the step S3, into the gain correction circuit and the bias correction circuit through the storage, then regulating the bias current of the light source into an intermediate value $I_{m/2}$, and simultaneously recording voltage values $v2_1[m/2]$, $v2_2[m/2]$, $v2_3[m/2]$, ..., $v2_n[m/2]$ output by the n photodiodes under the bias current of the light source;

S5: carrying out averaging on n voltage values $v2_1[m/2]$, $v2_2[m/2]$, $v2_3[m/2]$, ..., $v2_n[m/2]$ obtained in the step S4, then translating all the response straight lines of the output voltages towards an average value, and only regulating the correction data vectors of the bias correction circuit to obtain a group of new correction data vectors $b_3[1:n]$;

S6: repeating the step S4 and the step S5 until dispersions of the response straight lines of the out voltages meet requirements, and then obtaining correction data vectors $a_2[1:n]$ of the gain correction circuit and correction data vectors $b_4[1:n]$ of the bias correction circuit;

S7: carrying out linearity range expansion on the response straight lines of the output voltages, which are obtained in the step S6, slightly increasing each value in the correction data vectors $a_2[1:n]$ of the gain correction circuit, and slightly reducing each value of the correction data vectors $b_4[1:n]$ of the bias correction circuit, so as to obtain new correction data vectors $a_3[1:n]$ of the gain correction circuit and new correction data vectors $b_5[1:n]$ of the bias correction circuit;

S8: by the host computer, transmitting the correction data vectors $a_3[1:n]$ of the gain correction circuit and the correction data vectors $b_5[1:n]$ of the bias correction circuit to the gain correction circuit and the bias correction circuit through the storage, detecting whether linearity ranges of the response straight lines of the output voltages meet requirements, and if no, repeating the step S7 until the requirements are met, so as to obtain correction data vectors $a_4[1:n]$ of the gain correction circuit and correction data vectors $b_6[1:n]$ of the bias correction circuit;

S9: detecting whether the dispersions of the response straight lines of the output voltages at the moment meet requirements, and if no, respectively inputting, by the host computer, two groups of new initial correction data $a_4[1:n]$ and $b_6[1:n]$ to the correction data vectors of the gain correction circuit and the correction data vectors of the bias correction circuit through the storage, and repeatedly executing the steps S1 to S9 until the dispersions and the linearity ranges of the response straight lines of the output voltages meet the requirements.

\* \* \* \* \*